US007830649B2

(12) United States Patent
Yang

(10) Patent No.: US 7,830,649 B2
(45) Date of Patent: Nov. 9, 2010

(54) BALLAST WITH MULTILEAD WIRES

(76) Inventor: Kevin Yang, 1225 Via Coronel, Palos Verdes Estates, CA (US) 90274

( * ) Notice: Subject to any disclaimer, the term of this patent is extended or adjusted under 35 U.S.C. 154(b) by 420 days.

(21) Appl. No.: 12/154,894

(22) Filed: May 28, 2008

(65) Prior Publication Data

US 2009/0295304 A1 Dec. 3, 2009

(51) Int. Cl.
*H02B 1/18* (2006.01)

(52) U.S. Cl. ........................ 361/674; 361/601; 361/825; 361/826; 439/620.01; 439/304; 439/577

(58) Field of Classification Search ................. 361/601, 361/622, 674, 825, 826; 439/620.01, 620.21, 439/296, 304, 345, 577
See application file for complete search history.

(56) References Cited

U.S. PATENT DOCUMENTS 4,729,740 A * 3/1988 Crowe et al. ............... 439/76.1
4,916,363 A * 4/1990 Burton et al. ............... 315/276
5,006,764 A * 4/1991 Swanson et al. ............ 315/276
5,019,938 A * 5/1991 Sridharan et al. ........... 361/674
5,147,215 A * 9/1992 Pritulsky ..................... 439/344
5,350,316 A * 9/1994 Van Wagener et al. ...... 439/460
5,377,075 A * 12/1994 Schmid et al. .............. 361/674
5,658,067 A * 8/1997 Engle et al. ................. 362/222
5,720,546 A * 2/1998 Correll et al. ............... 362/221
5,762,509 A * 6/1998 Kang ......................... 439/232
5,864,461 A * 1/1999 Cho ........................... 361/674

* cited by examiner

*Primary Examiner*—Thuy Vinh Tran
(74) *Attorney, Agent, or Firm*—Clement Cheng

(57) ABSTRACT

A ballast with multilateral lead wires is provided for supplying a power for fluorescent lamps. The ballast comprises a lid and a longitudinal container for containing a ballast circuit for processing an input power and generating a lamp power supply to one or more of the lamps. The circuit includes an input connector mounted on an edge of the circuit for receiving input power wires and an output connector mounted on the opposite edge of the circuit from the input connector for connecting one or more sets of output lead wires. The lid is tightly fastened over the container and has two opposite edgewise basins with access openings for the wires to the input and output connectors.

20 Claims, 3 Drawing Sheets

BALLAST WITH MULTILEAD WIRES

BACKGROUND AND THE INVENTION

1. Field of the Invention

The present invention relates to a fluorescent lamp ballast. More particularly, the present invention relates to a ballast structure for providing an advanced connection leads management through a minor modification to existing ballast enclosure.

2. Discussion of Related Art

Fluorescent lamps are replacing more old incandescent fixtures due to their efficiency in converting a higher percentage of the electric power into light, which is more even and diffused in many circumstances. In order to operate a tubular form of a fluorescent bulb, a fluorescent fixture normally includes a ballast for limiting current through a thin ionizing gas in vacuum and a starter to supply power for starting the bulb to generate ionizing electrons. Ballasts come in discrete cases and need a firm mounting on a hidden side of the fluorescent fixture or a junction box. The ballast, in an electronic design, comprises on a printed circuit board (PCB) active and passive components surface mounted on thru-holes formed in PCB including capacitors, a choke coil, transistors, at least one transformer and resistors all housed in a secure metal enclosure so that it is not opened. In case of failure, it is not a repairable component but to be simply replaced as a whole. For such replacement, wires must be relocated into the new ballast.

However, different fixture specifications for the respective lamp types may require different lead directions such as longitudinal versus perpendicular directions of the wires in order to reinstall the ballast. Because conventional ballasts have set terminal locations to connect with wires it has been attempted to employ adaptors to mount one type of ballast to an incompatible fixture. To avoid these wire management problems, electricians had to prepare two groups of ballasts, which are essentially same besides the wire lead directions.

In an effort to reduce the inventory effort, modifications to the ballast enclosure as well as the circuitry itself have been made.

As shown in FIG. 1, a lamp ballast 1 has an enclosure 2 that comprises a top case 3 and a base case 4 of sheet metal. Inside of the enclosure 2, connected components on PCB (printed circuit board) are mounted and a dielectric sheet liner may be interposed between the components and the case 3 for insulation. Top case 3 has notched bracket portions 5 for mounting on a section 6 of lamp fixture or an adapter plate. The illustrated type of ballast is found available under the name ‘SmartMate’ by Advance Transformer Co., Rosemont, Ill. having a side connection set of lead wires 7. This ballast permits an alternative top connection set of lead wires 8 to be provided. Each set of wires 7 or 8 is connected to an input power terminal strip 9 of ballast 1 and an output lamp terminal strip 10. Conventionally, side lead wires 7 have been possible by side opening of the terminal strips 9, 10 and top lead wires 8 needed top opening of the terminal strips 9, 10. Of different possible mounting configurations, many surface mounted lamp fixtures on ceiling may need side lead wires while recessed lighting fixtures may require top lead wires mounted on a junction box, which is in turn mounted on the recessed fixture.

This ‘dual-entry’ connection of the prior art ballast sought to reduce the unnecessary inventory management to carry more ballast models from purchase to installation. However, such reduction only comes with the setback of requiring a specialized component of 2-conductor PCB terminal strip, which needs disposal of the existing inventory of single conductor strips for replacement. In addition, the enclosure always leaves unnecessary openings A solution is necessary to keep the currently established construction of ballast circuit and be able to have the connection wires lead in one of the two appropriate directions, which are vertical and horizontal without a significant redesign of the ballast.

In view of the foregoing deficiency of the state of the art ballast enclosures, an object of the present invention is to provide a lamp ballast with a novel enclosure for allowing the connection wires to have two selectable lead directions requiring no changes in the existing ballast circuit.

SUMMARY OF THE INVENTION

According to the present invention, the dual-lead option does not require a substantial redesign of the entire ballast but a change of an upper case of the ballast. In particular, opposite edges of the ballast case are formed to have contoured chamfers for harboring wire leads so that the leads may freely extend longitudinally within the profile of the ballast body or in perpendicular direction depending on the mounting requirements for each fixture specification.

A ballast with multilateral lead wires is provided according to the present invention for supplying a power for energizing fluorescent lamps. The ballast comprises (a) a longitudinal container with five sided walls and an opening for containing a ballast circuit for processing an input power and generating a lamp power supply to one or more of the lamps, the circuit including an input connector mounted on an edge of the circuit for receiving input power wires and an output connector mounted on the opposite edge of the circuit from the input connector for connecting one or more sets of output lead wires; (b) a lid having four sided walls sized to tightly fastened over the container and a top wall having two opposite edgewise basins with access openings for the wires to the input and output connectors; and (c) two opposite brackets formed integral to the lid next to the basins for fastening the ballast to a lamp fixture. Therefore, the lid permits the input power wires and output lead wires to enter the input connector and output connector, respectively from a common longitudinal plane lower than the level of the lid as well as in a perpendicular direction with respect to the longitudinal plane as determined by the positions of receiving ends of the ballast wires in the lamp fixture.

The ballast may also have an interlocking means between the container and lid for permanently fastening them together. The interlocking means may include a couple of smaller depressions with inward longitudinal edges formed on two opposing side walls of the lid, a couple of push tabs defined by crescent slots formed on the same side walls, larger depressions with downward longitudinal edges formed on the walls of the container for receiving the lid depressions so that they interlock by the inward edges engaging the downward edges as the lid is pressed onto the container, and tab holes formed on the walls of the base for holding the push tabs of the lid when they are crimped inwardly of the ballast through the tab holes to establish a permanent assembly of the ballast.

The ballast further comprises bushings shaped to fit tightly into and over the basins of the lid for protecting the wires from an abrasive injury, each of the bushings having a short tubular body with multiple lengthwise protrusions for engaging inner diameters of the access openings of the basins and a top shoulder surrounding the tubular body to keep the bushings rest on the access openings and wherein the basins are contoured smoothly to merge with the general surface of the lid to provide a smooth surrounding for the wires to contact.

The objects, features, and advantages of the present invention are readily apparent from the following detailed description of the best mode for carrying out the invention when taken in connection with the accompanying drawings.

BRIEF DESCRIPTION OF THE DRAWINGS

Similar reference numbers denote corresponding features throughout the attached drawings.

| | | | | | |
|---|---|---|---|---|---|
| 1: | Lamp Ballast | 2: | Enclosure | 3: | Top Case |
| 4: | Base Case | 5: | Bracket Portion | 6: | Fixture Section |
| 7, 8: | Lead Wire | 9, 10: | Terminal Strip | | |
| 12: | Ballast Circuit | 14: | Printed Circuit Board | 16: | Electric Components |
| 18: | Base | 20: | Cover | 22: | Top Opening |
| 24: | Longitudinal Wall | 26: | Transverse Wall | 27: | Tab |
| 28: | Input Connector | 30: | Output Connector | 32: | Terminal Inlet |
| 34: | Wire | 36: | Terminal Outlet | 38: | Output Wire |
| 40: | Sidewall | 42, 43: | Transverse Wall | 44, 46: | Bracket |
| 48: | Open Slot | 50, 54: | Basin | 52: | Elongated Opening |
| 56: | Smaller Opening | 58, 60: | Bushing | 62: | Tubular Body |
| 64: | Protrusion | 66: | Top Shoulder | 68: | Notch |
| 70: | Depressed Latch | 72: | Larger Depression | 74: | Downward Edge |
| 76: | Push Tab | 78: | Hole | 80: | Crescent Slot |
| 82: | Fixture Area | 84: | Screw | 100: | Ballast |

DETAILED DESCRIPTION OF THE BEST MODE PREFERRED EMBODIMENT

Figure 1:
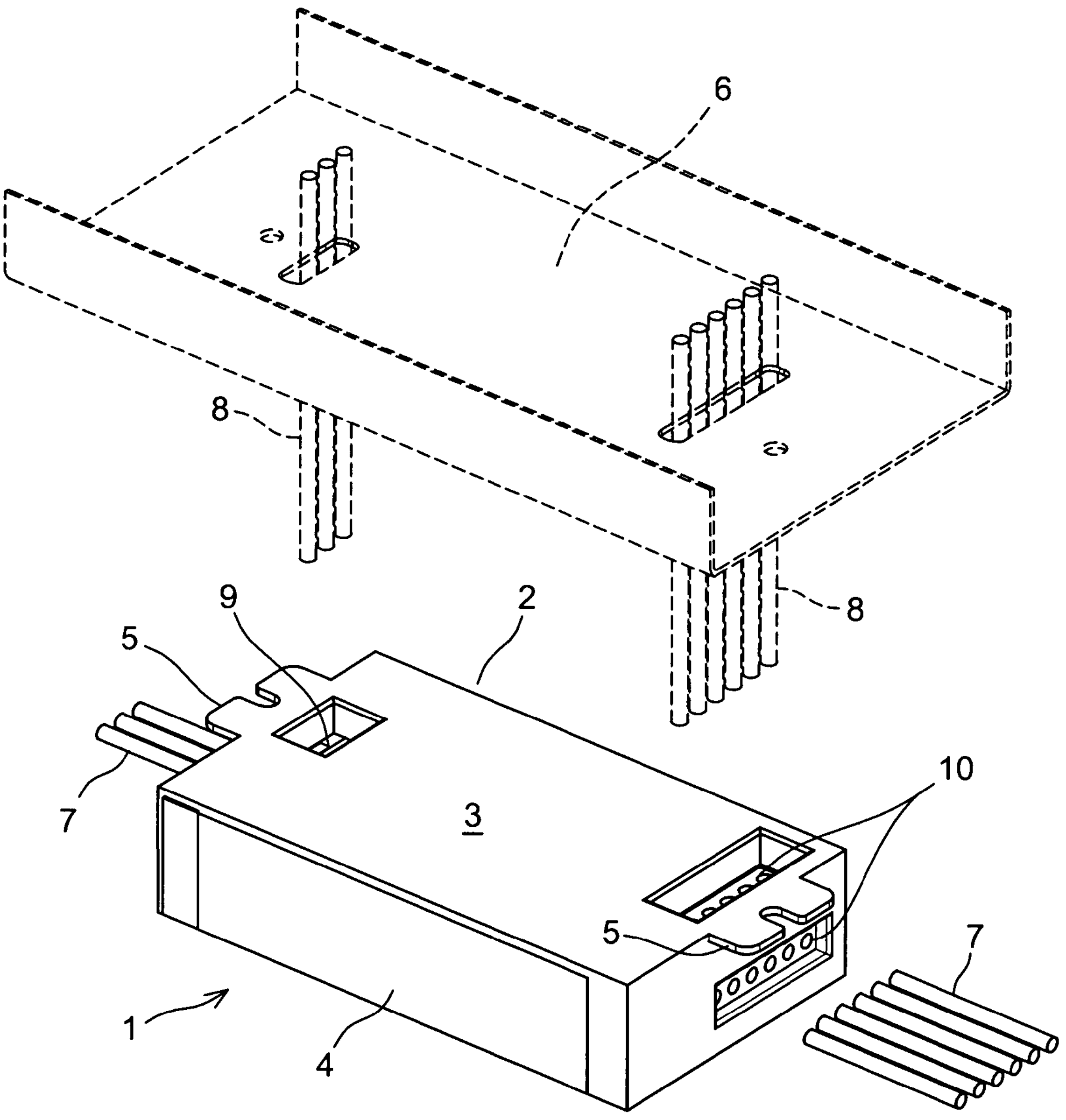
FIG. 1 PRIOR ART
FIG. 1 is a perspective view of a prior art lamp ballast to be mounted on a fixture portion.
Figure 2:
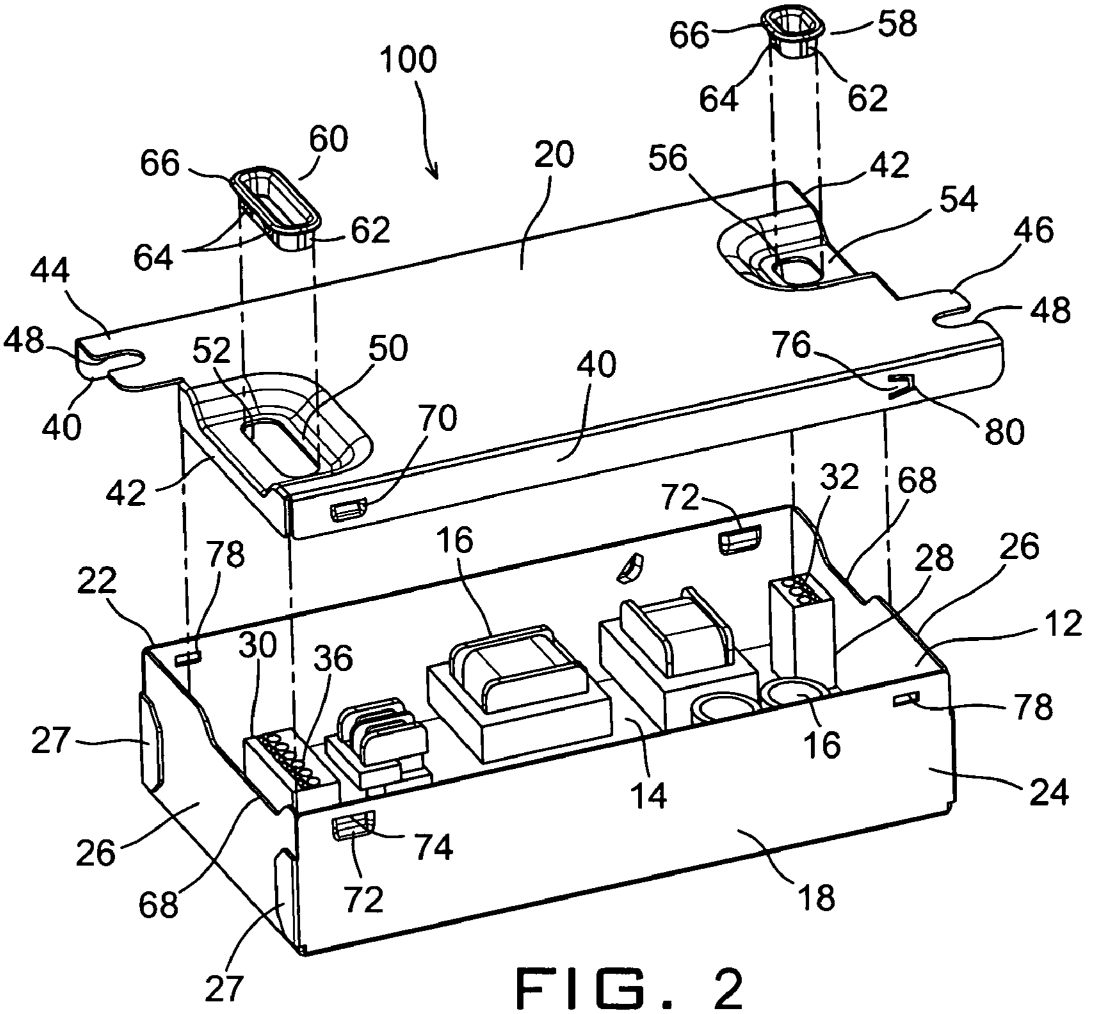
FIG. 2 is an exploded perspective view of an electronic ballast on a PCB encased according to one embodiment of the invention.

With reference to FIG. 1, an electronic ballast assembly 100 for fluorescent lamps has a ballast circuit 12 that comprises a PCB (printed circuit board) 14 with the electric components 16 mounted thereon. Ballast circuit 12 is housed in a box shaped base 18 and a cover 20 for permanently closing base 18 at its top opening 22. Base 18 may be made of a piece of shaped sheet metal folded into an open box structure. Base 18 may have a bottom area just enough to support PCB 14 and two opposing longitudinal walls 24 extending upright from the bottom. Also, two opposing transverse walls 26 are extending upright from the bottom between walls 24 and each of the walls 26 is held at its opposite ends by a couple of tabs 27, respectively which extend from walls 24 and crimped at right angle over transverse walls 26, thereby completing the box base 18.

Figure 3:
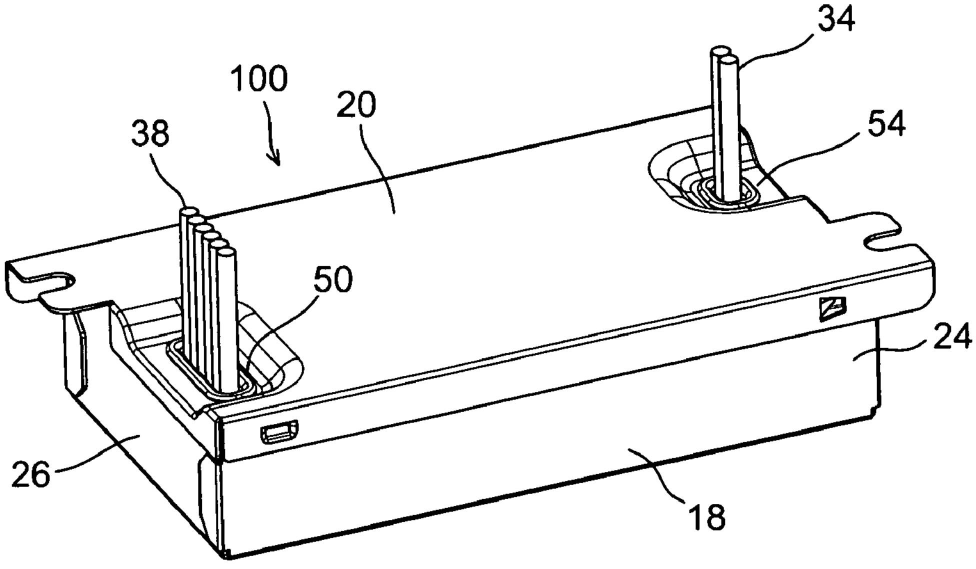
FIG. 3 is a perspective view of the ballast of FIG. 2 assembled and connected by input and output wires extending in a vertical direction.
Figure 4:
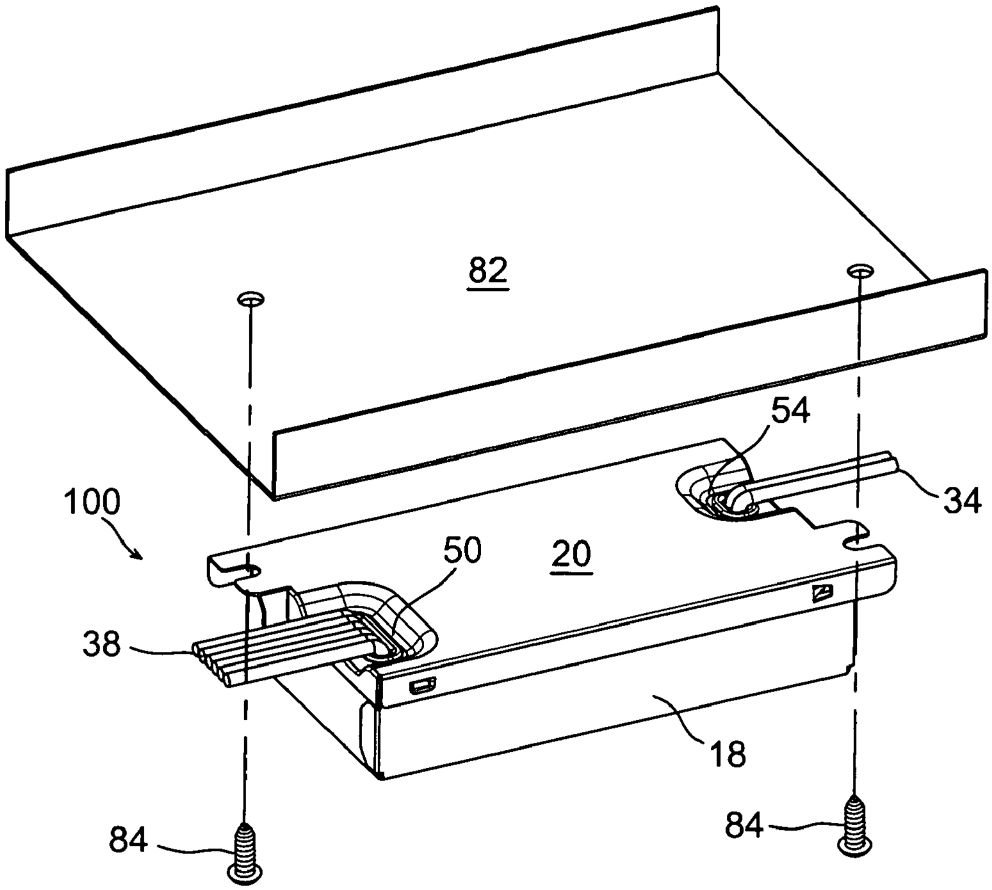
FIG. 4 is a bottom perspective view of the ballast of FIG. 3 with the same wires leading to parallel directions in accordance with a different mounting specification.
Figure 5:
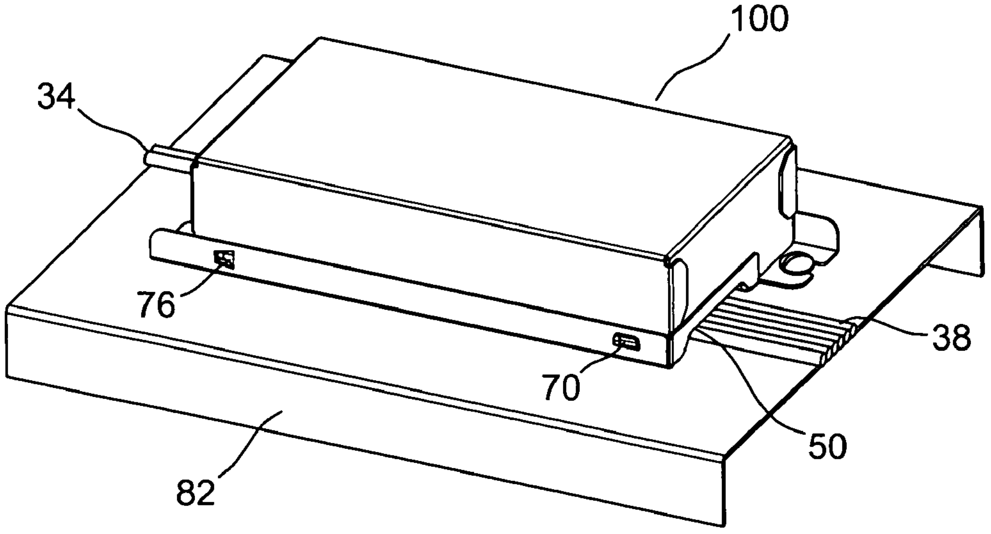
FIG. 5 is a top perspective view of the ballast of FIG. 4.

PCB 14 housed in base 18 having input connector 28 is soldered at one end thereof while an output connector 30 is connected at the opposite end of PCB 14. Ballast 100 is exemplified herein for US domestic use and powered by the commercial or residential power line. So, there are three sets of terminal inlets 32 in input connector 28 for a live wire, a neutral wire, and an optional ground wire of which two wires 34 are shown extending perpendicularly of ballast 100 in FIG. 3. At the other end of input connector 28, the output connector 30 has multiple terminal outlets 36 for distributing the high frequency current to fluorescent lamp(s) of a predetermined number depending on the ballast circuit 12 design. For example, FIG. 3 shows six output wires 38 assuming an appropriate upright position for mounting ballast 100 to a fixed object like a junction box.

The gist of the present invention resides in the contour of cover 20, which is generally rectangular to tightly cover the corresponding top opening 22 of base 18. Like base 18, cover 20 may be made of a shaped metal plate through folding at side edges, which include two opposite sidewalls 40 extending the entire longitudinal length of cover 20 beyond the length of longitudinal walls 24 and two transverse walls 42 and 43 positioned diametrically opposite from each other. Transverse walls 42, 43 stop short of an integral bracket 44 and a bracket 46, respectively which are formed on cover 20 at its diametrically opposite corners protruding outwardly to hang over base 18. On each of brackets 44, 46, an open slot 48 may be formed for a screw of a fastener to pass and affix ballast 100 to a stationary wall. Part of transverse wall 42 and its proximal area of cover 20 are deep drawn to form a basin 50 opened outwardly of ballast 100. Basin 50 is located right above outlet connector 30 and sized to approximately match the same. In the center of basin 50 is an elongated opening 52 formed in a size large enough to allow an unobstructed access of wires 38 to terminal outlets 36 of output connector 30 below.

For input connector 28, a similar but correspondingly smaller basin 54 may be formed facing outwardly to match the narrower input connector 28. A smaller opening 56 may be formed on basin 54 for wires 34 to pass and enter terminal inlets 32 of input connector 28. In order to protect the sheaths of wires 34 and 38, plastic bushings 58 and 60 may fit tightly into and over openings 56 and 52, respectively. Each of the bushings 58, 60 comprises a short tubular body 62 with multiple lengthwise protrusions 64 for engaging inner diameters of openings 52, 56 and a top shoulder 66 surrounding tubular body 62 to keep bushings 58, 60 rest above basins 54, 50 and provide a smooth contact for wire sheaths. In addition, basins 50, 54 are contoured smoothly to merge with the general surface of cover 20. Thus, the wires 34, 38 will be completely under protection against cutting damage. Each edgewise basin has a depth of more than twice the output lead wires in thickness.

Alternatively, bushing 60 may be modified to replace the basin 50/bushing 60 assembly while bushing 58 is reshaped to replace the basin 54/bushing 58 assembly. Specifically, out of cover 20 basin 50 and the proximal transverse wall 42 areas may be voided and the voids may be filled with equivalently shaped plastic inserts, which provide the equal functions of the basins 50, 54 and bushings 58, 60.

Alternatively, the bushings 58, 60 can be replaced by stamping the cover 20 so that the cover has openings 52 with a radius curvature. The stamped radius curvature can be curbed inward into the box so that wire leads have a smooth exterior surface. The radius curvature can also be curved outward so that it flares outward, which would also present a smooth opening 52 surface to the wire leads. In any case, the radius curvature need not be extreme and need only be to such an extent as to provide wires lead longevity.

On the part of base 18, a couple of notches 68 may be formed on top edges of transverse walls to receive the downward protrusion of basins 50, 54 when cover 20 is laid on base 18. Therefore, the specific dimension of each notch 68 corresponds to different sizes of basin 50, 54. Attachment of cover 20 to base 18 may be made permanently by the respective integral fastening means, which comprises at least one depressed latch 70 with a top horizontal edge (not shown) for sidewall 40 of cover 20, larger depressions 72 with a downward edge 74 formed on base 18 where the top edge of latch 70 interlocks with edge 74 when base 18 and cover 20 are pressed together. There are two depressions 72 formed at diametrically opposite locations of base 18 in the illustrated embodiment as are the mating depressions 70 at the side of cover 20. On the respective sidewalls, there are formed push tabs 76 at the other ends of depressions 70 whereas punched holes 78 are formed on the corresponding locations of base 18. Push tabs 76 are defined by crescent slots 80 formed about tabs 76. Different from the preformed depressions 72, push tabs 76 are normally flush with sidewalls 40 until they are crimped into holes 78. This process allows a smooth assembly of cover 20 onto base 18 creating less stress but more positive fastening between the two members in completing ballast 100.

Two holes 78 are formed at diametrically opposite locations of base 18 as are the mating tabs 76 at the side of cover 20. In FIG. 3, ballast 100 is shown complete with lead wires 34, 38, which need no more relocation to adapt to different mounting requirements. In case ballast 100 is adapted to connect to a compact fluorescent lamp where the receiving ends of wires 34, 38 are right above cover 20, wires 34, 38 may run straight up as shown.

In another case where the receiving ends, i.e. the fluorescent lamp sockets are at longitudinally projected locations from ballast 100, wires 32, 38 may be bent easily 90 degrees outwardly within basins 50, 54 and below the top surface of ballast 100, which is then mounted flush on a fixture area 82 using two screws 84. Therefore, ballast 100 of the present invention preserves the proven performance of the existing circuitry breaking free from the prior art limitation in mounting choice due to the directional change of lead wires.

Therefore, while the presently preferred form of the ballast has been shown and described, it is to be understood that the present invention is not limited to the sole embodiment describe above, but encompasses any and all embodiments within the scope of the following claims.

The invention claimed is:

1. A ballast for fluorescent lamps comprising:

a ballast circuit on a longitudinal printed circuit board for receiving input power wires and generating a lamp power supply to one or more lamps, the circuit including an input connector mounted near an edge of the circuit board for receiving the input power wires in a direction perpendicular to the circuit board and an output connector mounted on the opposite edge from the input connector for connecting one or more sets of output lead wires in the same perpendicular direction;

a lower case enclosing the ballast circuit and having a bottom plane for supporting the circuit board and four surrounding walls extending upright from the bottom plane and secured together to form a generally rectangular opening for introducing the ballast circuit;

a cover having a longitudinal top plate with four downward walls for interlocking with the lower case to cover the rectangular opening, the plate generally extending in a plane and including a first open recess located edgewise between the top plate and the downward wall near the input connector and a second open recess spanning the top plate and the opposite downward wall near the output connector; and two opposite brackets formed integral to the cover next to the open recesses for fastening the ballast to a lamp fixture, whereby the cover permits the input power wires and output lead wires to enter the input connector and output connector, respectively from a common longitudinal plane lower than the top plate of the cover as well as in the perpendicular direction from above as determined by the positions of receiving ends of the ballast wires.

2. The ballast of claim 1, further comprising: an interlocking means between the base and cover for permanently fastening them together.

3. The ballast of claim 2, wherein the interlocking means includes a couple of smaller depressions with inward longitudinal edges formed on the downward walls of the cover, a couple of push tabs defined by crescent slots formed on the same downward walls, larger depressions with downward longitudinal edges formed on the surrounding walls of the base for receiving the cover depressions so that they interlock by the inward edges engaging the downward edges as the cover is pressed onto the base, and tab holes formed on the surrounding walls of the base for holding the push tabs of the cover when they are crimped inwardly of the ballast through the tab holes to establish a permanent assembly of the ballast.

4. The ballast of claim 1, further comprising bushings shaped to fit tightly into and over the open recesses of the cover for protecting the wires from an abrasive injury, each of the bushings having a short tubular body with multiple lengthwise protrusions for engaging inner diameters of the open recesses and a top shoulder surrounding the tubular body to keep the bushings rest on the open recesses and wherein the open recesses are contoured smoothly to merge with the general surface of the cover to provide a smooth surrounding for the wires to contact.

5. A ballast with multilateral lead wires for supplying a power for fluorescent lamps comprising:

a longitudinal container with side walls and an opening for containing a ballast circuit for processing an input power and generating a lamp power supply to one or more of the lamps, the circuit including an input connector mounted on an edge of the circuit for receiving input power wires and an output connector mounted on the opposite edge of the circuit from the input connector for connecting one or more sets of output lead wires;

a lid having four sided walls sized to tightly fastened over the container and a top wall having two opposite edgewise basins with access openings for the wires to the input and output connectors; and two opposite brackets formed integral to the lid next to the basins for fastening the ballast to a lamp fixture, whereby the lid permits the input power wires and output lead wires to enter the input connector and output connector, respectively from a common longitudinal plane lower than the level of the lid as well as in a perpendicular direction with respect to the longitudinal plane as determined by the positions of receiving ends of the ballast wires in the lamp fixture.

6. The ballast of claim 5, further comprising: an interlocking means between the container and lid for permanently fastening them together.

7. The ballast of claim 6, wherein the interlocking means includes a couple of smaller depressions with inward longitudinal edges formed on two opposing side walls of the lid, a couple of push tabs defined by crescent slots formed on the same side walls, larger depressions with downward longitudinal edges formed on the walls of the container for receiving the lid depressions so that they interlock by the inward edges engaging the downward edges as the lid is pressed onto the container, and tab holes formed on the walls of the base for holding the push tabs of the lid when they are crimped inwardly of the ballast through the tab holes to establish a permanent assembly of the ballast.

8. The ballast of claim 5, further comprising bushings shaped to fit tightly into and over the basins of the lid for protecting the wires from an abrasive injury, each of the bushings having a short tubular body with multiple lengthwise protrusions for engaging inner diameters of the access openings of the basins and a top shoulder surrounding the tubular body to keep the bushings rest on the access openings and wherein the basins are contoured smoothly to merge with the general surface of the lid to provide a smooth surrounding for the wires to contact.

9. A ballast having multilateral lead wires for supplying a power for fluorescent lamps comprising:

A. a container of longitudinal orientation with side walls and an opening for containing a ballast circuit for processing an input power and generating a lamp power supply to one or more of the lamps, the circuit including an input connector mounted on an edge of the circuit for receiving input power wires and an output connector mounted on the opposite edge of the circuit from the input connector for connecting one or more sets of output lead wires, wherein the output lead wires have a thickness;

B. a lid having four sided walls sized and fastened over the container and a top wall having two opposing edgewise basins, wherein each edgewise basin has an access opening for wires to the input connectors and output connectors, wherein each edgewise basin has a depth of more than twice the output lead wires in thickness; and C. two opposite brackets formed integral to the lid next to the basins for fastening the ballast to a lamp fixture, wherein the lid directs the input power wires and output lead wires to enter the input connector and output connector, respectively from a common longitudinal plane lower than the level of the lid with respect to the longitudinal plane as determined by the positions of receiving ends of the ballast wires in the lamp fixture.

10. The ballast of claim 9 further comprising: a stamped radius curvature formed at the access opening.

11. The ballast of claim 9 further comprising: a bushing formed at each access opening.

12. The ballast of claim 11, wherein each of the bushings has a short tubular body with multiple lengthwise protrusions for engaging inner diameters of the open recesses and a top shoulder surrounding the tubular body; wherein the open recesses are contoured smoothly to merge with the general surface of the cover.

13. The ballast of claim 9, further comprising: an interlocking means between the container and lid for permanently fastening them together.

14. The ballast of claim 13, wherein the interlocking means further includes a couple of smaller depressions with inward longitudinal edges formed on two opposing side walls of the lid, a couple of push tabs defined by crescent slots formed on the same side walls, larger depressions with downward longitudinal edges formed on the walls of the container for receiving the lid depressions so that they interlock by the inward edges engaging the downward edges as the lid is pressed onto the container, and tab holes formed on the walls of the base for holding the push tabs of the lid when they are crimped inwardly of the ballast through the tab holes to establish a permanent assembly of the ballast.

15. The ballast of claim 9, further comprising: a second edgewise basin also with an access opening for wires to the input connectors and output connectors.

16. The ballast of claim 15, further comprising: a stamped radius curvature formed at the access opening.

17. The ballast of claim 15, further comprising: a bushing formed at each access opening.

18. The ballast of claim 17, wherein each of the bushings has a short tubular body with multiple lengthwise protrusions for engaging inner diameters of the open recesses and a top shoulder surrounding the tubular body; wherein the open recesses are contoured smoothly to merge with the general surface of the cover.

19. The ballast of claim 15, further comprising: an interlocking means between the container and lid for permanently fastening them together.

20. The ballast of claim 19, wherein the interlocking means further includes a couple of smaller depressions with inward longitudinal edges formed on two opposing side walls of the lid, a couple of push tabs defined by crescent slots formed on the same side walls, larger depressions with downward longitudinal edges formed on the walls of the container for receiving the lid depressions so that they interlock by the inward edges engaging the downward edges as the lid is pressed onto the container, and tab holes formed on the walls of the base for holding the push tabs of the lid when they are crimped inwardly of the ballast through the tab holes to establish a permanent assembly of the ballast.

* * * * *